United States Patent [19]

Doesburg

[11] 3,984,200

[45] Oct. 5, 1976

[54] CARPET DYEING ANTIFOAM

[75] Inventor: Van I. Doesburg, Midland, Mich.

[73] Assignee: Dow Corning Corporation, Midland, Mich.

[22] Filed: Apr. 2, 1975

[21] Appl. No.: 564,257

Related U.S. Application Data

[62] Division of Ser. No. 313,892, Dec. 11, 1972.

[52] U.S. Cl. .................................. 8/82; 252/321; 252/358; 8/DIG. 1
[51] Int. Cl.² .................. C09B 67/00; D06P 1/673
[58] Field of Search ........................... 8/DIG. 1, 82

[56] References Cited
UNITED STATES PATENTS

| | | | |
|---|---|---|---|
| 3,233,986 | 2/1966 | Morehouse | 44/76 |
| 3,355,474 | 11/1967 | Wheeler | 260/448.8 |
| 3,402,192 | 9/1968 | Haluska | 260/448.2 |
| 3,518,288 | 6/1970 | Haluska | 260/448.2 |
| 3,746,653 | 7/1973 | Churchfield | 252/321 |

*Primary Examiner*—Joseph L. Schofer
*Assistant Examiner*—A. L. Clingman
*Attorney, Agent, or Firm*—Jack E. Moermond

[57] ABSTRACT

A composition consisting essentially of (1) a siloxane glycol copolymer, (2) a foam control agent, and (3) a hydroxyl endblocked polydimethylsiloxane is disclosed.

7 Claims, No Drawings

CARPET DYEING ANTIFOAM

This is a division of application Ser. No. 313,892, filed Dec. 11, 1972.

Direct and indirect losses from fires run into the billions of dollars each year. These losses occur in property, injuries and lives. Much effort has been expended in finding ways and means for preventing or reducing such losses. In the past decade the Federal Government has become increasingly involved in these efforts. One result of this involvement is Federal Standard DOC-FF-1-70 which makes it mandatory that all carpets manufactured after Apr. 15, 1971 pass the Methenamine Tablet Test for carpet flammability. This test is commonly referred to in the industry as the "pill" test.

During the dyeing of carpeting in its manufacture it is necessary to use an antifoam agent to control the foaming which occurs in the dye beck. Various polydimethylsiloxane based antifoam compositions have been used for this purpose. When reports began to appear indicating that the silicone antifoam compositions used in polyester carpet dyeing processes increased the carpets flammability they were regarded with disbelief. Everyone knows that silicones are "inert" and "non-flammable." An investigation into the problem showed that while the silicones presently employed as antifoams were per se inert and non-flammable, there were plausible mechanisms by which they could contribute to the increased flammability of the polyester carpet. Therefore, the problem was to find a material or composition which would be an effective antifoam agent in the carpet dyeing process, which would not cause spotting or streaking of the carpet, and which did not have an adverse effect on the carpets flammability, i.e., the carpet must pass the pill test.

In accordance with this invention there has been discovered an antifoam composition which consists essentially of (1) a siloxane glycol copolymer, (2) a foam control agent, and (3) a hydroxyl endblocked polydimethylsiloxane. This composition is useful in carpet dyeing processes, and particularly in dyeing polyester carpeting.

More specifically, the composition of this invention consists essentially of (1) a composition which consists essentially of 30 to 90 percent by weight of a siloxane glycol copolymer selected from the group consisting of siloxane glycol copolymers having the general formulae:

a. $R_aSi\{(OSiMe_2)_n(OSiMeG)_bOSiMe_2G\}_{4-a}$,
b. $R_aSi\{(OSiMe_2)_n(OSiMeG)_cOSiMe_3\}_{4-a}$,
c. $GMe_2Si(OSiMe_2)_n(OSiMeG)_bOSiMe_2G$, and
d. $Me_3Si(OSiMe_2)_n(OSiMeG)_cOSiMe_3$ in which formulae R is a hydrocarbon radical free of aliphatic unsaturation and contains from 1 to 10 carbon atoms, Me is a methyl radical, G is a radical of the structure $-D(OR')_mA$ wherein D is an alkylene radical containing from 1 to 30 carbon atoms, R' is an alkylene radical containing from 2 to 10 carbon atoms, $m$ has a value of at least 1, and A is a capping group, $a$ has a value of 0 or 1, $n$ has a value of at least 1, $b$ has a value of 0 to 50, and $c$ has a value of 1 to 50, (2) 5 to 35 percent by weight of a foam control agent which consists essentially of 85 to 96 parts by weight of a liquid triorganosilyl endblocked polydimethylsiloxane having a viscosity of at least 20 centistokes at 25°C., 4 to 12 parts by weight of silica, and 0 to 3 parts by weight of a siloxane resin consisting essentially of $SiO_2$ units and $(CH_3)_3SiO_{1/2}$ units, the ratio of $SiO_2$ units to the $(CH_3)_3SiO_{1/2}$ units being in the range of 1:0.4 to 1:1.2, and (3) 5 to 35 percent by weight of a liquid hydroxyl endblocked polydimethylsiloxane having a viscosity of 50 to 200 centistokes at 25°C.

The first component of the composition is a siloxane glycol copolymer having the general formulae (a), (b), (c) or (d) as set forth above. In these formulae R can be any hydrocarbon radical free of aliphatic unsaturation which contains from 1 to 10 carbon atoms such as a methyl, ethyl, propyl, isopropyl, butyl, hexyl, decyl, phenyl, tolyl, benzyl, xylyl, methylcyclohexyl, cyclohexyl, cyclopentyl, $\beta$-phenylpropyl or a $\beta$-phenylethyl radical.

Specific examples of alkylene radical D which links the glycol portion of G to the silicon atom are the methylene, ethylene, propylene, isopropylene, butylene, octylene, decylene, octadecylene and the myricylene radicals. Preferably D contains from 1 to 18 carbon atoms.

R' in the above formula is any alkylene radical containing from 2 to 10 carbon atoms. Thus R' can be an ethylene, propylene, isopropylene, butylene, hexylene, octylene or a decylene radical. Most preferably R' contains from 2 to 4 carbon atoms. It is noted that R' can be derived from a single glycol or a combination of glycols. That is to say, for example, OR' can be ethylene oxide units, propylene oxide units or butylene oxide units only, or OR' can be combinations of such units.

The symbol $m$ which defines the number of OR' units in the glycol portion of the molecule can have a value as low as 1 and can range up to 1000 or more. Generally, $m$ will have an average value in the range of 10 to 100.

The glycol or polyoxyalkylene unit is terminated or capped by the A group. The specific nature of this group is not known to be critical for purposes of this invention. Thus the glycol can be capped by a hydroxyl group (A is a hydrogen atom), by an ether group (A is a monovalent hydrocarbon radical such as a methyl, butyl, vinyl or phenyl radical), by a carboxyl radical, by the salt or ester of a crboxyl radical, by a carbonate ester group, or by an isocyanate group.

The symbol $n$ which defines the number of dimethylsiloxane units in the molecules can have a value of at least 1 and can range up to 1500 or more. It is believed that the number of dimethylsiloxane units in the molecule in relationship to the glycol containing G units should be at least 10:1 for the most satisfactory results to be obtained. The upper ratio of $OSiMe_2$ units to G containing units can be 50:1 or more.

The siloxane glycol copolymers useful herein are well known commercially available materials. For those unfamiliar with these compounds attention is directed to U.S. Pat. Nos. 3,402,192; 3,518,288; and 3,637,783 for illustrative descriptions of their preparations and other details. The entire disclosures of the foregoing patents are incorporated herein by reference.

The siloxane glycol copolymer can constitute from 30 to 90 percent by weight of the composition.

The second component of the composition is the foam control agent. This agent can constitute from 5 to 35 percent by weight of the composition. The foam control agent consists essentially of from 85 to 96 parts by weight of a liquid triorganosilyl endblocked polydimethylsiloxane having a viscosity of at least 20 centistokes at 25°C., from 4 to 12 parts by weight of silica, and from 0 to 3 parts by weight of a siloxane resin composed of $(CH_3)_3SiO_{1/2}$ units and $SiO_2$ units in which resin the ratio of $(CH_3)_3SiO_{1/2}$ units to the $SiO_2$ units is within the range of from 0.4:1 to 1.2:1.

The liquid triorganosilyl endblocked polydimethylsiloxanes are well known articles of commerce available from numerous sources. They can be prepared by various techniques such as the cohydrolysis and subsequent condensation of triorganomonohalosilanes and dimethyldihalosilanes, or by the cracking and subsequent condensation of dimethylcyclosiloxanes. The organo endblocking groups can generally be any of the well known hydrocarbon radicals, but it is preferred that they contain from 1 to 6 carbon atoms. The trimethylsilyl endblocking group is probably the most common commercially. Dimethylphenylsilyl and dimethylvinylsilyl groups are also quite common. Examples of other organo groups include the ethyl, propyl, butyl, amyl, hexyl, cyclohexyl, allyl and octadecyl radicals. To obtain significant antifoam or defoam performance the viscosity of the triorganosilyl endblocked polydimethylsiloxane must be at least 20 centistokes at 25°C. The upper viscosity limit of this component is not critical and can range up to 1,000,000 centistokes or more. Best results are believed to be obtained when the viscosity of the triorganosilyl endblocked polydimethylsiloxane is in the range of 20 to 2000 centistokes at 25°C.

The siloxane resin which may be employed in the composition is also a standard article of commerce available from various sources. It can be prepared by the cohydrolysis and condensation of $(CH_3)_3SiCl$ and $SiCl_4$ or by reacting $(CH_3)_3SiCl$ with an acidic silica sol. Its preparation is detailed in a host of places in the literature and therefore, will not be set forth again here.

A silica aerogel is one kind of silica to employ in the composition. Briefly, such materials are prepared by displacing water from a silica hydrogel with a low boiling organic liquid such as ethyl alcohol, heating the treated gell in an autoclave to approximately the critical temperature of the organic liquid, and then releasing the vapors of the organic liquid from the autoclave whereby excessive shrinking or crushing of the cellular structure of the silica is avoided. The details of this technique are described in the literature and silica aerogels are commercially available. Other silicas such as precipitated silicas, silica xerogels, fume silicas, and treated silicas which have organosilyl groups on their surface can also be employed. These and other silicas which can be employed herein are well known and will be obvious to those skilled in the art.

The third essential component of the composition is a liquid hydroxyl endblocked polydimethylsiloxane having a viscosity of 50 to 200 centistokes at 25°C. which can constitute from 5 to 35 percent by weight of the composition. This component can be prepared by well known techniques such as the hydrolysis and condensation of dimethyldichlorosilane, or by the cracking and subsequent condensation of dimethylcyclosiloxanes. It has been found that it is necessary for this third component to be soluble in component two, the foam control agent, if no adverse effect is desired on carpets passing the pill test. Those materials having a viscosity in the range specified above have been found to have the requisite solubility.

The composition of this invention is prepared by simply mixing the three components together in the correct proportions. So far as is known at this time there is no particular order in which the components need be mixed. So far as is known at this time, the best method for preparing the composition of this invention is to add the hydroxylated dimethylsiloxane to the siloxane glycol copolymer and mix well. Then the foam control agent is added and mixed well, and finally the composition is passed through a colloid mill.

The amount of the conposition of this invention which is employed will depend on the particular system in which foam is to be controlled and the extent to which the user wishes to control the foam. Thus the amounts will vary depending on whether one is using the composition in an alkaline soap solution, evaporation of alkaline paper black liquor, concentration of synthetic rubber latices, steam distillation of styrenebutadiene emulsions, refining sugar, dyeing textiles, treating sewage for disposal, or something else. Generally speaking 20 to 150 parts per million of the composition of this invention based on both the volume of the system in which foam is to be controlled will suffice for most applications. The compositions of this invention can be used as any kind of foam control agents, i.e., as defoaming agents and/or antifoaming agents. Defoaming agents are generally considered as foam reducers whereas antifoaming agents are generally considered as foam preventors. As noted, the instant conpositions can serve in either or both capacities. It should be noted that the compositions of this invention can be employed at 100% solids, i.e., neat, or emulsions or solutions thereof in suitable solvents can be made and used where this simplifies handling and addition to the system.

Now in order that those skilled in the art may better understand how the present invention can be practiced, the following examples are given by way of illustration and not by way of limitation. All parts and percents referred to herein are by weight, and all viscosities measured at 25°C., unless otherwise specified.

EXAMPLE 1

A composition was prepared which consisted essentially of (1) 50% of a siloxane glycol copolymer of the general formula

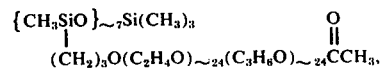

(2) 25% of a foam control which consisted essentially of about 88 parts of a trimethylsilyl endblocked polydimethylsiloxane having a viscosity of about 1000 cs., about 10 parts of a silica aerogel, and about 2 parts of a siloxane resin consisting essentially of $SiO_2$ units and $(CH_3)_3SiO_{1/2}$ units, said units being in the ratio of 1:0.4 to 1:1.2, and (3) 25% of a hydroxyl endblocked polydimethylsiloxane having a viscosity of about 75 cs.

The above composition was prepared by adding component (3) to component (1), mixing well, then adding component (2), mixing well again, and then passing the mixture once through a low speed colloid mill having a setting of about 15 mils and exit temperature of about 55°C.

This composition was used to control foam in a polyester carpet dyeing process. The composition was diluted in cold water and added at about a 0.02% solids level to the carpet dye beck. Antifoam performance was good throughout the usual dye cycle. The various styles of carpet dyed in the presence of this antifoam composition were tested for flammability using the Methenamine Tablet Test.

The pill test procedure is as follows. Eight samples of the carpet to be tested are cut into 9-inch squares and placed in a drying oven in which there is free air circulation. They are dried for two hours at 105°C. and then cooled in a desiccator cabinet for at least one hour. The carpet specimen is removed from the desiccator with gloved hands and the pile is brushed to the upright position. It is placed in the test chamber and a steel measuring ring with an 8-inch diameter is positioned on the specimen. A methenamine tablet is placed on the specimen in the center of the ring and ignited with a match. If the area of the carpet burned does not extend to within one inch of the steel ring (3 inches in any direction) the sample passes the test. Six of the eight samples must pass the test for the carpet to pass the government specifications.

Test results from dyeing carpet with the composition above are set forth in the Table below.

| Carpet Style | Pill Test | |
|---|---|---|
| | Number Passed | Number Failed |
| Viceroy | 8 | 0 |
| Duvol | 8 | 0 |
| 2" Shag | 8 | 0 |
| Kuster Dyed Carpet* | 4 | 4 |

*Included for comparison. This carpet was not subjected to a cold water rinse after the dyeing process was complete. It is theorized that the cold water rinse after dyeing causes any antifoam composition on the carpet to be removed and thereby insures that the silicone does not increase the flammability of the carpet and enables it to pass the pill test.

EXAMPLE 2

A composition was prepared as in Example 1 except that it is consisted essentially of 70% of component (1), 15% of component (2), and 15% of component (3). This composition was evaluated under plant conditions as an antifoam in a jet dyeing textile process. This composition was used in four different jet dye machines at a concentration of 2 pounds per machine. In each case excellent form control was achieved through the entire dye cycle. No dye or silicone spots were observed on the textile materials. These tests were conducted dyeing with burgundy, black and light tan shades, three of the most difficult to dye properly. Using one of the presently available commercial silicone antifoam compositions specifically designed for the jet dyeing process, these shades require as much as 5 pounds of the antifoam composition per machine to control the foam at the critical depressurizing stage.

EXAMPLE 3

When the following siloxane glycol copolymers are substituted for component (1) in previous examples, similar results are obtained.

A. $MeSi\{(OSiMe_2)_{120}(OSiMeG)_{10}OSiMe_2G\}_3$
wherein G is $-(CH_2)_4(OC_2H_4)_{50}(OC_3H_6)_{50}OC_4H_9$ B. $Si\{(OSiMe_2)_{96}(OSiMeG)_8OSiMe_3\}_4$
wherein G is $-(CH_2)_6(OC_2H_4)_{30}(OC_3H_6)_{25}-(OC_4H_{8-})_5OCH_3$ C. $GMe_2Si(OSiMe_2)_{120}(OSiMeG)_8OSiMe_2G$
wherein G is $-(CH_2)_3O(C_2H_4)_{15}(OC_3H_6)_{30}OOCCH_3$ D. $Me_3Si(OSiMe_2)_{750}(OSiMeG)_{50}OSiMe_3$
wherein G is $-(CH_2)_3(OC_2H_4)_{25}(OC_3H_6)_{25}OOCCH_5$

EXAMPLE 4

When the following antifoam compositions are substituted for component (2) in the previous examples, similar results are obtained.

A. 95 parts of a trimethylsilyl endblocked polydimethylsiloxane having a viscosity of about 1000 cs. and 5 parts of silica aerogel.

B. 95 parts of a trimethylsilyl endblocked polydimethylsiloxane having a viscosity of about 350 cs. and 5 parts of silica aerogel.

EXAMPLE 5

When hydroxyl endlocked polydimethylsiloxanes having viscosities in the range of 50 to 200 cs. are substituted for component (3) in the preceding examples, similar results are obtained.

That which is claimed is:

1. In a carpet dyeing process which includes the use of a foam control agent, the improvement comprising using as the foam control agent a composition which consists essentially of 1. 30 to 90 percent by weight of a siloxane glycol copolymer selected from the group consisting of siloxane glycol copolymers having the general formulae
   a. $R_aSi\{(OSiMe_2)_n(OSiMeG)_bOSiMe_2G\}_{4-a}$,
   b. $R_aSi\{(OSiMe_2)_n(OSiMeG)_cOSiMe_3\}_{4-a}$,
   c. $GMe_2Si(OSiMe_2)_n(OSiMeG)_bOSiMe_2G$, and
   d. $Me_3Si(OSiMe_2)_n(OSiMeG)_cOSiMe_3$ in which formulae
   R is a hydrocarbon radical free of aliphatic unsaturation and contains from 1 to 10 carbon atoms,
   Me is a methyl radical,
   G is a radical of the structure $-D(OR')_mA$ wherein
     D is an alkylene radical containing from 1 to 30 carbon atoms,
     R' is an alkylene radical containing from 2 to 10 carbon atoms,
     m has a value of at least 1, and
     A is a capping group,
   a has a value of 0 or 1,
   n has a value of at least 1,
   b has a value of 0 to 50, and
   c has a value of 1 to 50, 2. 5 to 35 percent by weight of a foam control agent which consists essentially of 85 to 96 parts by weight of a liquid triorganosilyl endblocked polydimethylsiloxane having a viscosity of at least 20 centistokes at 25°C., 4 to 12 parts by weight of silica, and 0 to 3 parts by weight of a siloxane resin consisting essentially of $SiO_2$ units and $(CH_3)_3SiO_{1/2}$ units, the ratio of $SiO_2$ units to the $(CH_3)_3SiO_{1/2}$ units being in the range of 1:0.4 to 1:1.2, and 3. 5 to 35 percent by weight of a liquid hydroxyl endblocked polydimethylsiloxane having a viscosity of 50 to 200 centistokes at 25°C.

2. A carpet dyeing process as defined in claim 1 wherein in the foam control agent composition (1) is 50 to 70 percent and has the general formula (d), (2) is 15 to 25 percent and the triorganosilyl endblocked polydimethylsiloxane therein has a viscosity in the range of 20 to 20,000 cs., and (3) is 15 to 25 percent.

3. A carpet dyeing process as defined in claim 2 wherein in the foam control agent conposition (1) is about 50 percent and has the general formula $Me_3Si(OSiMe_2)_{75}(OSiMeG)_7-OSiMe_3$ wherein G is $-(CH_2)_3(OC_2H_4)_{24(OC_3H_6)_{24}}OOCCH_3$, (2) is about 25 percent and consists essentially of about 88 parts of a trimethylsilyl endblocked polydimethylsiloxane having a viscosity of about 1000 cs., about 10 parts of a silica aerogel, and about 2 parts of a siloxane resin consisting essentially of $SiO_2$ units and $(CH_3)_3SiO_{1/2}$ units, said units being in the ratio of 1:0.4 to 1:1.2, and (3) is about 25 percent and has a viscosity of about 75 cs.

4. A carpet dyeing process as defined in claim 2 wherein in the foam control agent composition (1) is about 70 percent and has the general formula $Me_3Si(OSiMe_2)_{75}\text{—}(OSiMeG)_7OSiMe_3$ wherein G is $\text{—}(CH_2)_3(OC_2H_4)_{24}(OC_3H_6)_{24}\text{—}OOCCH_3$, (2) is about 15 percent and consists essentially of about 88 parts of a trimethylsilyl endblocked polydimethylsiloxane having a viscosity of about 1000 cs., about 10 parts of a silica aerogel, and about 2 parts of a siloxane resin consisting essentially of $SiO_2$ units and $(CH_3)_3SiO_{1/2}$ units, said units being in the ratio of 1:0.4 to 1:1.2, and (3) is about 15 percent and has a viscosity of about 75 cs.

5. A carpet dyeing process as defined in claim 2 wherein in the foam control agent composition (1) has the general formula $Me_3Si(OSiMe_2)_{75}(OSiMeG)_7OSiMe_3$ wherein G is $\text{—}(CH_2)_3(OC_2H_4)_{24}(OC_3H_6)_{24}OOCCH_3$, and (2) consists essentially of about 95 parts of a trimethylsilyl endblocked polydimethylsiloxane and about 5 parts of a silica aerogel.

6. In a carpet dyeing process which includes the use of a foam control agent and the step of a cold water rinse after the dyeing is complete, the improvement comprising using as the foam control agent a composition which consists essentially of 1. 30 to 90 percent by weight of a siloxane glycol copolymer selected from the group consisting of siloxane glycol copolymers having the general formulae
   a. $R_aSi\{(OSiMe_2)_n(OSiMeG)_bOSiMe_2G\}_{4-a}$,
   b. $R_aSi\{(OSiMe_2)_n(OSiMeG)_cOSiMe_3\}_{4-a}$,
   c. $GMe_2Si(OSiMe_2)_n(OSiMeG)_bOSiMe_2G$, and
   d. $Me_3Si(OSiMe_2)_n(OSiMeG)_cOSiMe_3$
   in which formulae
   R is a hydrocarbon radical free of aliphatic unsaturation and contains from 1 to 10 carbon atoms,
   Me is a methyl radical,
   G is a radical of the structure $\text{—}D(OR')_mA$ wherein
     D is an alkylene radical containing from 1 to 30 carbon atoms,
     R' is an alkylene radical containing from 2 to 10 carbon atoms,
     m has a value of at least 1, and
     A is a capping group,
   a has a value of 0 or 1,
   n has a value of at least 1,
   b has a value of 0 to 50, and
   c has a value of 1 to 50, 2. 5 to 35 percent by weight of a foam control agent which consists essentially of 85 to 96 parts by weight of a liquid triorganosilyl endblocked polydimethylsiloxane having a viscosity of at least 20 centistokes at 25°C., 4 to 12 parts by weight of silica, and 0 to 3 parts by weight of a siloxane resin consisting essentially of $SiO_2$ units and $(CH_3)_3SiO_{1/2}$ units, the ratio of $SiO_2$ units to the $(CH_3)_3SiO_{1/2}$ units being in the range of 1:0.4 to 1:1.2, and 3. 5 to 35 percent by weight of a liquid hydroxyl endblocked polydimethylsiloxane having a viscosity of 50 to 200 centistokes at 25°C.

7. In a process of controlling foam in a carpet dyeing process which includes the addition of a foam control agent to the carpet dye system in which the foaming is to be controlled, the improvement comprising using as the foam control agent a composition consisting essentially of 1. 30 to 90 percent by weight of a siloxane glycol copolymer selected from the group consisting of siloxane glycol copolymers having the general formulae
   a. $R_aSi\{(OSiMe_2)_n(OSiMeG)_bOSiMe_2G\}_{4-a}$,
   b. $R_aSi\{(OSiMe_2)_n(OSiMeG)_cOSiMe_3\}_{4-a}$,
   c. $GMe_2Si(OSiMe_2)_n(OSiMeG_bOSiMe_2G$, and
   d. $Me_3Si(OSiMe_2)_n(OSiMeG)_cOSiMe_3$
   in which formulae
   R is a hydrocarbon radical free of aliphatic unsaturation and contains from 1 to 10 carbon atoms,
   Me is a methyl radical,
   G is a radical of the structure $\text{—}D(OR')_mA$ wherein
     D is an alkylene radical containing 1 to 30 carbon atoms,
     R' is an alkylene radical containing from 2 to 10 carbon atoms,
     m has a value of at least 1, and
     A is a capping group,
   a has a value of 0 or 1,
   n has a value of at least 1,
   b has a value of 0 to 50, and
   c has a value of 1 to 50, 2. 5 to 35 percent by weight of a foam control agent which consists essentially of 85 to 96 parts by weight of a liquid triorganosilyl endblocked polydimethylsiloxane having a viscosity of at least 20 centistokes at 25°C., 4 to 12 parts by weight of silica, and 0 to 3 parts by weight of a siloxane resin consisting essentially of $SiO_2$ units and $(CH_3)_3SiO_{1/2}$ units, the ratio of $SiO_2$ units to the $(CH_3)_3SiO_{1/2}$ units being in the range of 1:0.4 to 1:1.2, and 3. 5 to 35 percent by weight of a liquid hydroxyl endblocked polydimethylsiloxane having a viscosity of 50 to 200 centistokes at 25°C.

* * * * *

UNITED STATES PATENT AND TRADEMARK OFFICE
CERTIFICATE OF CORRECTION

PATENT NO. : 3,984,200
DATED : October 5, 1976
INVENTOR(S) : VAN I. DOESBURG

It is certified that error appears in the above–identified patent and that said Letters Patent are hereby corrected as shown below:

Column 6, line 67, should read

-- $-(CH_2)_3(OC_2H_4)_{24}(OC_3H_6)_{24}OOCCH_3$, (2) is about 25 --

Column 8, line 25, should read

-- c. $GMe_2Si(OSiMe_2)_n(OSiMeG)_bOSiMe_2G$, and --

Signed and Sealed this

Twenty-seventh Day of November 1979

[SEAL]

Attest:

RUTH C. MASON
*Attesting Officer*

LUTRELLE F. PARKER
*Acting Commissioner of Patents and Trademarks*